(12) United States Patent
Ye et al.

(10) Patent No.: US 10,694,195 B2
(45) Date of Patent: Jun. 23, 2020

(54) METHODS AND APPARATUS FOR PALETTE CODING

(71) Applicant: TENCENT AMERICA LLC, Palo Alto, CA (US)

(72) Inventors: Jing Ye, San Jose, CA (US); Shan Liu, San Jose, CA (US); Xiaozhong Xu, State College, PA (US); Xiang Li, San Diego, CA (US); Meng Xu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/232,528

(22) Filed: Dec. 26, 2018

(65) Prior Publication Data

US 2019/0281311 A1    Sep. 12, 2019

Related U.S. Application Data

(60) Provisional application No. 62/640,002, filed on Mar. 7, 2018.

(51) Int. Cl.
| | |
|---|---|
| *H04N 19/186* | (2014.01) |
| *H04N 19/176* | (2014.01) |
| *H04N 19/82* | (2014.01) |
| *H04N 19/61* | (2014.01) |
| *H04N 19/159* | (2014.01) |
| *H04N 19/91* | (2014.01) |

(52) U.S. Cl.
CPC ......... *H04N 19/186* (2014.11); *H04N 19/159* (2014.11); *H04N 19/176* (2014.11); *H04N 19/61* (2014.11); *H04N 19/82* (2014.11); *H04N 19/91* (2014.11)

(58) Field of Classification Search
CPC .... H04N 19/107; H04N 19/11; H04N 19/119; H04N 19/124; H04N 19/159; H04N 19/174; H04N 19/176; H04N 19/18; H04N 19/186; H04N 19/436; H04N 19/593; H04N 19/70; H04N 19/91; H04N 19/93; H04N 19/61; H04N 19/82
USPC ....................... 375/240.03, 240.13
See application file for complete search history.

(56) References Cited

U.S. PATENT DOCUMENTS

| | | | | |
|---|---|---|---|---|
| 2016/0234494 A1* | 8/2016 | Seregin | ................ | H04N 19/119 |
| 2017/0374366 A1* | 12/2017 | Xiu | ....................... | H04N 19/176 |
| 2018/0020241 A1* | 1/2018 | Li | ........................ | H04N 19/124 |

* cited by examiner

*Primary Examiner* — Farzana Hossain
(74) *Attorney, Agent, or Firm* — Sughrue Mion, PLLC

(57) ABSTRACT

A method and apparatus for palette coding to permit the encoding and decoding of a video sequence using a chroma palette and a luma palette include determining that a luma color plane and a chroma color plane have different split tree structures. A luma palette is generated by associating a set of luma indices with a set of luma values. A chroma palette is generated by by associating a set of chroma indices with a first set of chroma values and a second set of chroma values. A set of samples of the video sequence is coded using the chroma palette and the luma palette.

19 Claims, 6 Drawing Sheets

Computer System 600

METHODS AND APPARATUS FOR PALETTE CODING

CROSS-REFERENCE TO RELATED APPLICATION

This application claims priority under 35 U.S.C. § 119 to U.S. Application No. 62/640,002, filed on Mar. 7, 2018, in the United States Patent & Trademark Office, the disclosure of which is incorporated herein by reference in its entirety.

FIELD

The present disclosure is directed to a method and an apparatus for palette coding.

BACKGROUND

Due to specific characteristics of screen contents, coding tools were developed for the Screen Coding Extension of HEVC. The tools demonstrate significant gains in coding efficiency. Among them, the palette mode represents block of pixels using indices to the palette (major colors), and encodes the palette and the indices by exploiting spatial redundancy. A typical palette mode coding method is composed of two parts: 1) coding methods for the palette, and 2) coding methods for the samples using the palette. The latter part is composed of palette index coding, run length coding, and escape pixel coding.

A very simple but efficient histogram-based algorithm is used to classify pixels. Specifically, the most significant L peak values in the histogram are selected as major colors, and the pixel values that are close to a major color will be quantized to the major color. Other pixels which do not belong to any major color sets are escape pixels, which will also be quantized before coding.

For lossless coding, the quantization processes are not used. For each pixel, a color index is assigned to indicate which color set it belongs to. If L major colors are used, the values of major colors 0 to (L−1) are signaled for the set of L major colors and the value of major color N is signaled for the escape pixel set. The palette is generally implemented as a color lookup table in which each color entry is associated with an index. A single palette is used to code both luma and chroma components. Each entry represents a specific RGB (YUV) color. For example, entry 1 with (R, G, B)=(0, 0, 0) represents the pure black color while entry 0 with (R, G, B)=(2, 10, 200) represents a blue-ish color. When the video format is 420, the chroma plane is up sampled to generate the color palette table.

The palette-based coding is performed on a CU basis. To code the current palette using the palette predictor list as a reference, a binary vector is used to indicate whether each entry in the palette predictor list is reused in the current palette. The reused entries are placed at the beginning of the current palette, maintaining their order in the palette predictor list. This is followed by new palette entries which are not in the palette predictor list. A palette initializer with predefined entries can be optionally used to initialize the palette predictor list, resulting in improved coding efficiency in such a scenario. A palette initializer can be signaled in the picture parameter set (PPS) or the sequence parameter set (SPS).

After classification, the pixels of a block can be converted into color indices according to the major color set selected. A predictive coding method is applied to the indices, where a pixel line can be predicted by three different modes, including horizontal mode (i.e., copy index mode), vertical mode (i.e., copy above mode) and normal mode (i.e., escape mode). Two index scan orders are used when coding the color indices, namely horizontal traverse scan and vertical traverse scan. An index rotation flag is signaled to indicate which scan order is used.

In copy index mode, starting from the first pixel, one or more consecutive indices are copied from the first pixel. The index of the first pixel is signaled. In copy above mode, one or more consecutive indices are copied from above pixel line. In escape mode, when an escape pixel is encountered (signaled by the largest index in major color set), its corresponding pixel value is coded right after the index. There may be more than 1 escape pixels and in different color values in the CU. For different escape pixel locations, the pixel values of escape pixels may be different.

For each copy index mode, an index value is signaled. The index signaling is grouped in the front to improve the CABAC throughput. The escape values are signaled in the back due to the same reason. The copy index mode and copy above mode are signaled in between the indices coding and escape coding.

Traditionally, a coding unit contains samples of both the luma and chroma components. It was proposed in JVET that samples of chroma components may have an independent or separate split tree structure as compared to luma components. Typically, such a separate coding tree structure starts from the CTU level. Therefore, it is possible that a chroma CU (a CU that contains only two chroma components) can be larger than its luma counterpart at the corresponding sample location.

SUMMARY

According to an aspect of the disclosure, a method for palette coding to permit the encoding and decoding of a video sequence using a chroma palette and a luma palette includes: determining that a luma color plane and a chroma color plane have different split tree structures; generating the luma palette by associating a set of luma indices with a set of luma values based on determining that the luma color plane and the chroma color plane have different split tree structures; generating the chroma palette by associating a set of chroma indices with a first set of chroma values and a second set of chroma values based on determining that the luma color plane and the chroma color plane have different split tree structures; and coding a set of samples of the video sequence using the chroma palette and the luma palette based on generating the luma palette and the chroma palette.

According to an aspect of the disclosure, a device for palette coding to permit the encoding and decoding of a video sequence using a chroma palette and a luma palette includes at least one memory configured to store program code; at least one processor configured to read the program code and operate as instructed by the program code, the program code including: determining code configured to cause the at least one processor to determine that a luma color plane and a chroma color plane have different split tree structures; generating code configured to cause the at least one processor to generate the luma palette by associating a set of luma indices with a set of luma values based on determining that the luma color plane and the chroma color plane have different split tree structures, wherein the generating code is further configured to cause the at least one processor to generate the chroma palette by associating a set of chroma indices with a first set of chroma values and a second set of chroma values based on determining that the luma color plane and the chroma color plane have different split tree structures; and coding code configured to cause the at least one processor to code a set of samples of the video sequence using the chroma palette and the luma palette based on generating the luma palette and the chroma palette.

According to an aspect of the disclosure, a non-transitory computer-readable medium storing instructions, the instructions comprising: one or more instructions that, when executed by one or more processors of a device for palette coding that permits the encoding and decoding of a video sequence using a chroma palette and a luma palette, cause the one or more processors to: determine that a luma color plane and a chroma color plane have different split tree structures; generate the luma palette by associating a set of luma indices with a set of luma values based on determining that the luma color plane and the chroma color plane have different split tree structures; generate the chroma palette by associating a set of chroma indices with a first set of chroma values and a second set of chroma values based on determining that the luma color plane and the chroma color plane have different split tree structures; and code a set of samples of the video sequence using the chroma palette and the luma palette based on generating the luma palette and the chroma palette.

BRIEF DESCRIPTION OF THE DRAWINGS

Further features, the nature, and various advantages of the disclosed subject matter will be more apparent from the following detailed description and the accompanying drawings in which.

PROBLEM TO BE SOLVED

When the luma and chroma color planes are coded separately, one palette table with multiple color components cannot be applied on the separate color planes. There is a need to develop a method to resolve such a problem.

DETAILED DESCRIPTION

Figure 1:
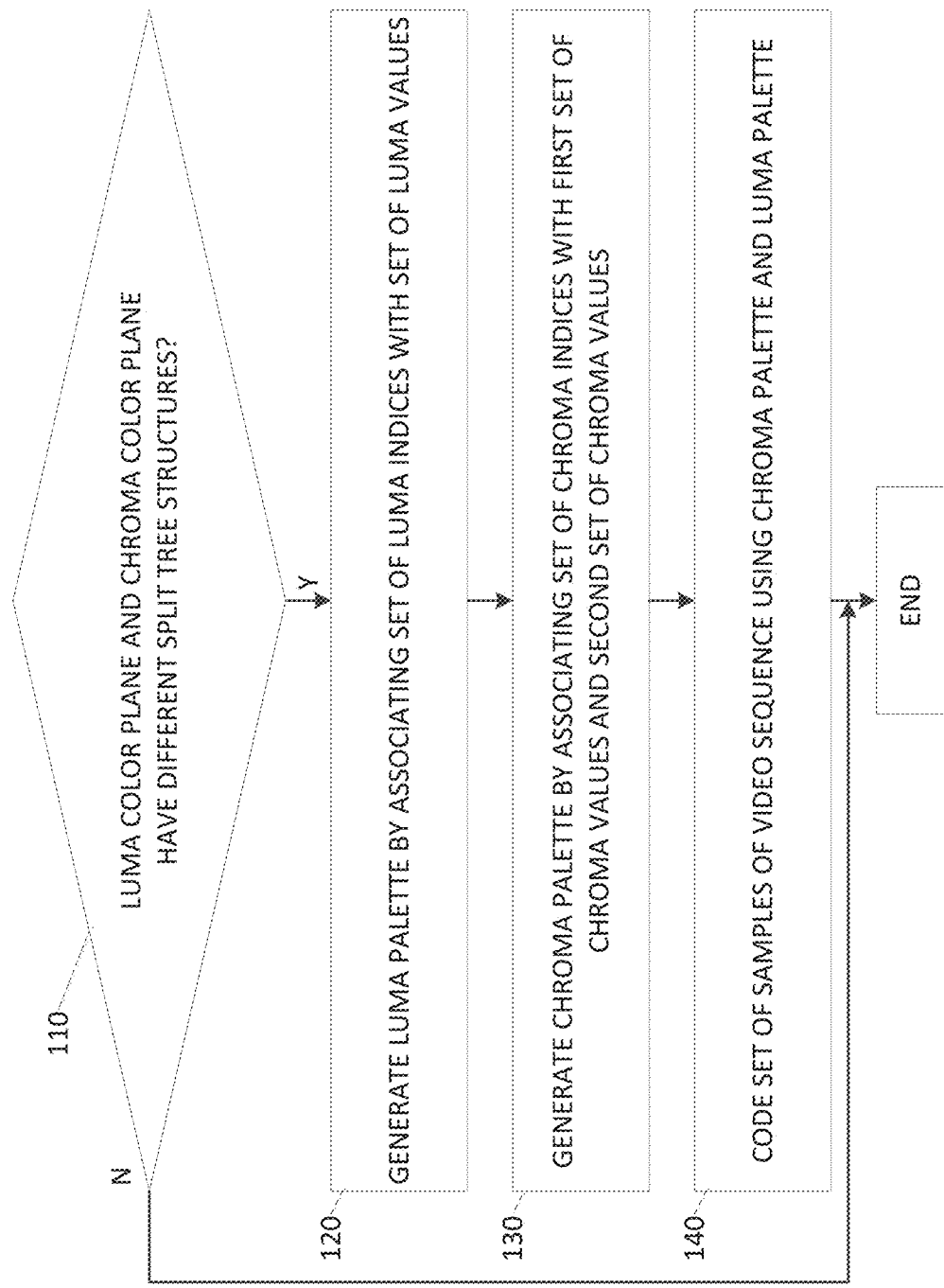
FIG. 1 is a flowchart of an example process for palette coding to permit the encoding and decoding of a video sequence using a chroma palette and a luma palette.

FIG. 1 is a flowchart of an example process 100 for a method for palette coding to permit the encoding and decoding of a video sequence using a chroma palette and a luma palette. In some implementations, one or more process blocks of FIG. 1 may be performed by a decoder. In some implementations, one or more process blocks of FIG. 1 may be performed by another device or a group of devices separate from or including a decoder, such as an encoder.

As shown in FIG. 1, process 100 may include determining whether a luma color plane and a chroma color plane have different split tree structures (block 110). If the luma color plane and the chroma color plane have a same split tree structure (block 110—NO), then the process ends. Otherwise, if the luma color plane and the chroma color plane have different split tree structures (block 110—YES), then process 100 may include generating a luma palette by associating a set of luma indices with a set of luma sample values (block 120); generating a chroma palette by associating a set of chroma indices with a first set of chroma sample values and a second set of chroma sample values (block 130); and coding a set of samples of a video sequence using the chroma palette and the luma palette (block 140).

According to an embodiment, one palette for each color plane is generated. In this case, the single luma component includes one color plane, and two chroma components share another color plane. Further, two palette predictors, and two color predictor initializers are generated. The predictors and initializers may include different sizes, or, alternatively, may include equal sizes.

According to an embodiment, signaling of the information can be done in the SPS or For the luma palette, each palette entry denotes a luma value. For the chroma palette, each palette entry include a set of values. As an example, in YUV color format, each entry combines U and V values. Thus, a single index map is generated for two chroma planes. The index map coding methods of the luma plane can be applied to chroma planes. The Chroma planes can also have a different index map coding method from the luma part.

According to another embodiment, a palette is generated for the luma component, and a palette is not generated for the chroma components. In this case, the luma plane will generate a palette table using luma values only. A luma color index map will also be generated. Coding methods for chroma components can include coding methods similar to methods in HEVC or JEM. If all the co-located smallest luma units are coded in intra-palette modes, or the ratio between the number/size of the smallest luma units in palette mode and the number/size of the smallest luma units in the collocated area, is greater than a certain threshold, a default intra mode can be used.

According to an embodiment, the default mode can include a predefined mode, such as DC mode, planar mode, horizontal mode, or vertical mode. In another embodiment, the default mode can include a mode from the neighboring blocks, such as from the above block or a left block as compared to the current block.

According to another embodiment, if all of the co-located smallest luma units are coded in intra-palette modes, or the ratio between the number/size of the smallest luma units in palette mode and the number/size of the smallest luma units in the collocated area, is greater than a certain threshold, the chroma block can be processed as follows: in one embodiment, the chroma block is split further into smaller partitions. If the chroma block has already reached the max depth, a further split might be prevented.

According to another embodiment, palette mode usage is constrained. To avoid overhead, palette mode is applied when the block size is greater than a threshold. The block size can be measured by the area of the block, a longer side of the block, the shorter side of a block, the perimeter of the block, a sum of the width and the height of the block, and/or the like. The threshold can be predefined or signaled at SPS, PPS, or slice header.

According to another embodiment, a palette has two scan orders, and one rotation flag indicates the scan direction. For narrow blocks (e.g., triple tree and binary tree blocks), a fixed scan order that depends on the block width and height is implemented. For example, in one embodiment, when the height/width>n, only vertical traverse scan is used. Alternatively, when the width/height>n, only horizontal traverse scan is used. In the foregoing examples, n is a positive integer, such as 1, 2, 5, etc. The threshold can be predefined or signaled at SPS, PPS, or slice header.

According to an embodiment, an n×m sized template from the current block's above or left neighbor is used to generate a template palette table. When only the above n×m region is available, the above reconstruction pixels are used to generate the palette table. When only the left n×m region is available, the left reconstruction pixels are used to generate the palette table. When both above and left reconstruction pixels are available, both above and left pixels are used to generate the palette table. The template palette size is "size_t." The template palette construction process can be similar as the process used for constructing the palette for the current block. Further, the template palette table using the reconstructed pixels is used to generate the palette table.

In one embodiment, if any or both of the above/left block(s) is coded using palette mode, the whole or partial template palette table entry can be copied from the above or left block, instead of generating the template palette table from the reconstructed pixels.

In one embodiment, the template palette table is generated based on luma and chroma reconstructed pixels. In another embodiment, the template palette table is generated based on luma only when coding luma samples and based on chroma only when coding chroma samples regardless of whether a separate tree is used. In another embodiment, and when a separate tree is used, the template palette is generated based on luma only when coding luma samples, and is based on luma and chroma when coding chroma samples.

In one embodiment, the template palette is used to predict the current palette. In HEVC SCC, a palette predictor list stores the previously coded palette entries as references to predict the current palette. This list is updated after each palette mode CU. It operates like a least recently-used cache. The latest palette is inserted at the beginning of the list and the entries from the farthest CUs in the scan order are discarded if the list size exceeds a threshold.

The template palette can be combined with a prediction technique of the signaling palette. In one embodiment, the template palette can be inserted after the palette predictor list. In another embodiment, the template palette can be inserted in the very beginning of the palette predictor list. The number of the inserted template palette is also signaled or predefined. The total size of the template palette and palette predictor list shall not exceed the maximum palette size. When using the template palette, the reconstruction of the current block cannot be processed during the parsing stage, it will be processed during the reconstruction stage.

In one embodiment, the template palette method is only used when the above or left block is not coded in palette mode. If both the above and left blocks are palette mode coded, the template palette can be skipped. If above block is palette coded, and the left block is not palette mode coded, only the left template will generate a template palette and inserted into the predictor list. If the left block is palette mode coded, and the above block is not palette mode coded, only the above template will generate a template palette and be inserted into the predictor list.

In an embodiment, the template palette is used to encode the current block. One flag will be signaled at the block level to indicate whether template palette mode is used or not. If the flag is true, then the current block is using template palette mode, the palette table is not signaled, and the current pixels are mapped into a color index by the template palette.

When using the template palette, the reconstruction of the current block might not be processed during the parsing stage, and instead might be processed during the reconstruction stage.

In another method, the template palette and non-template palette can be used on different color planes (e.g., when a separate tree is used). When coding a chroma block, if the co-located luma block is associated with palette mode, then the chroma block can use palette mode, and the palette can be derived from the above or left template, while the luma plane can still use signaled palette mode. In another embodiment, the luma can use template palette and chroma can signal the palette table. In yet another embodiment, the luma can use template palette and chroma can use the template palette table too.

Although FIG. 1 shows example blocks of process 100, in some implementations, process 100 may include additional blocks, fewer blocks, different blocks, or differently arranged blocks than those depicted in FIG. 1. Additionally, or alternatively, two or more of the blocks of process 100 may be performed in parallel.

Figure 2:
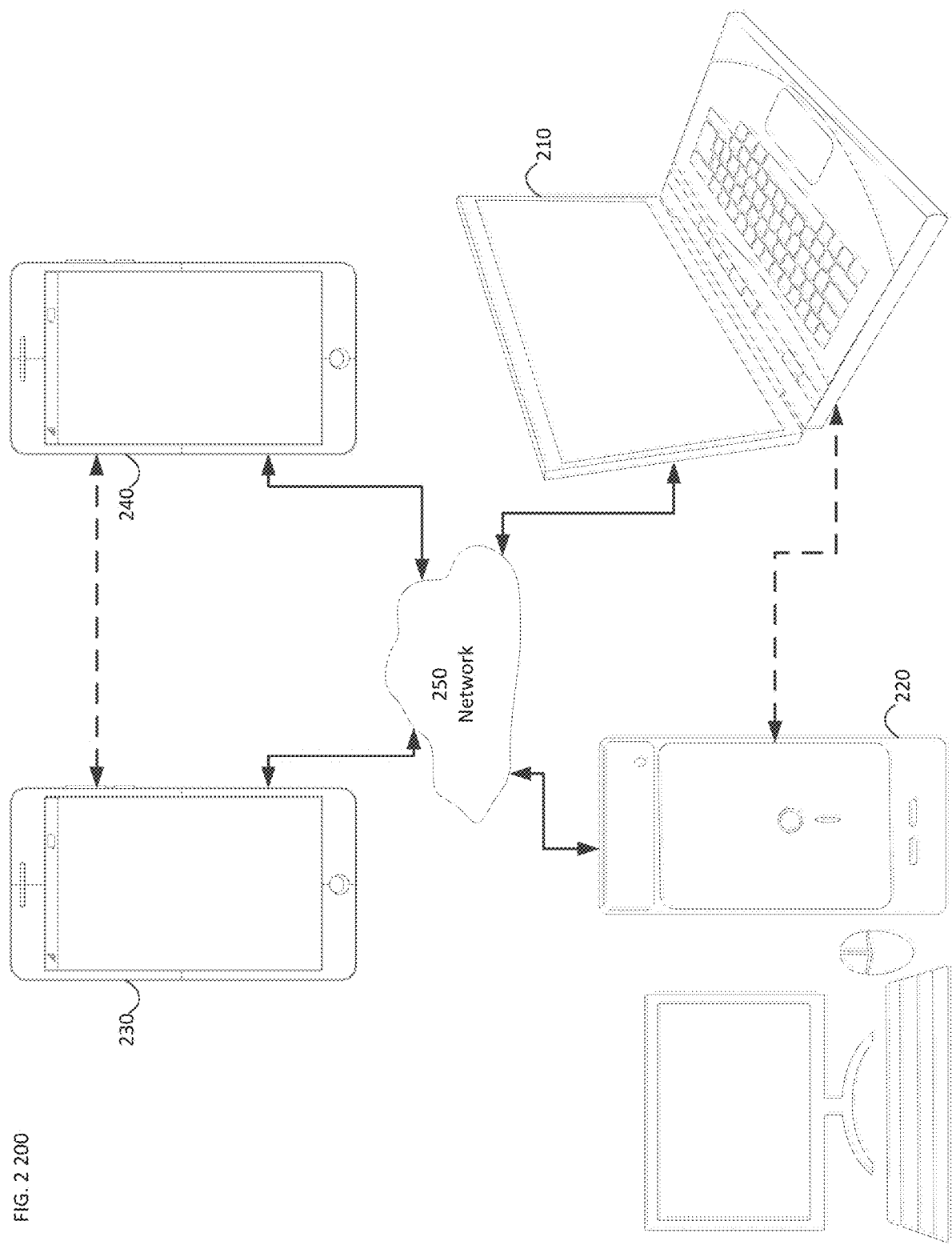
FIG. 2 is a simplified block diagram of a communication system according to an embodiment of the present disclosure.

FIG. 2 illustrates a simplified block diagram of a communication system (200) according to an embodiment of the present disclosure. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of the present disclosure are not so limited. Embodiments of the present disclosure find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
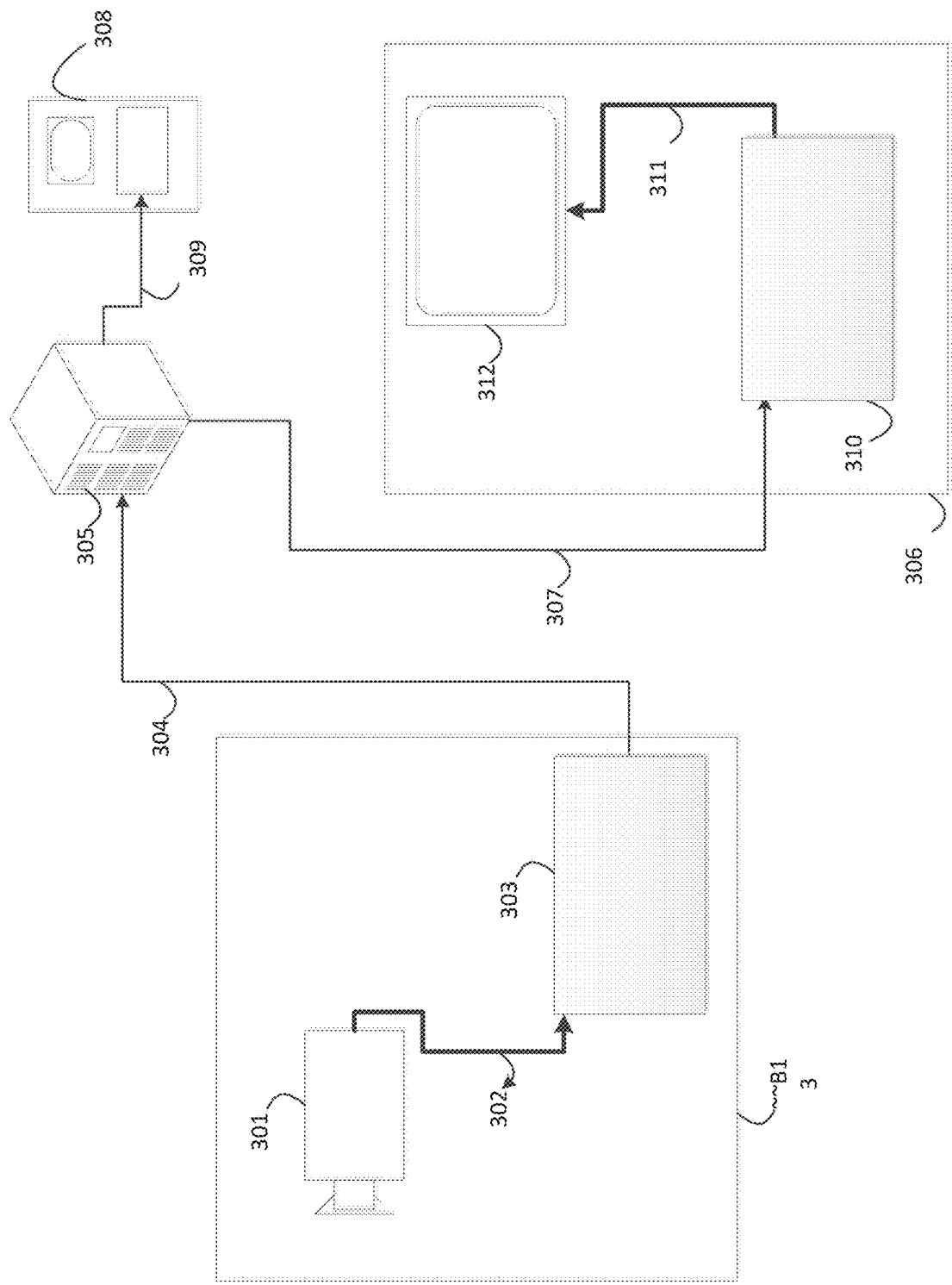
FIG. 3 is a diagram of the placement of a video encoder and decoder in a streaming environment.

FIG. 3 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera 301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/ compression standards. Examples of those standards include ITU-T Recommendation H.265. Under development is a video coding standard informally known as Versatile Video Coding (VVC). The disclosed subject matter may be used in the context of VVC.

Figure 4:
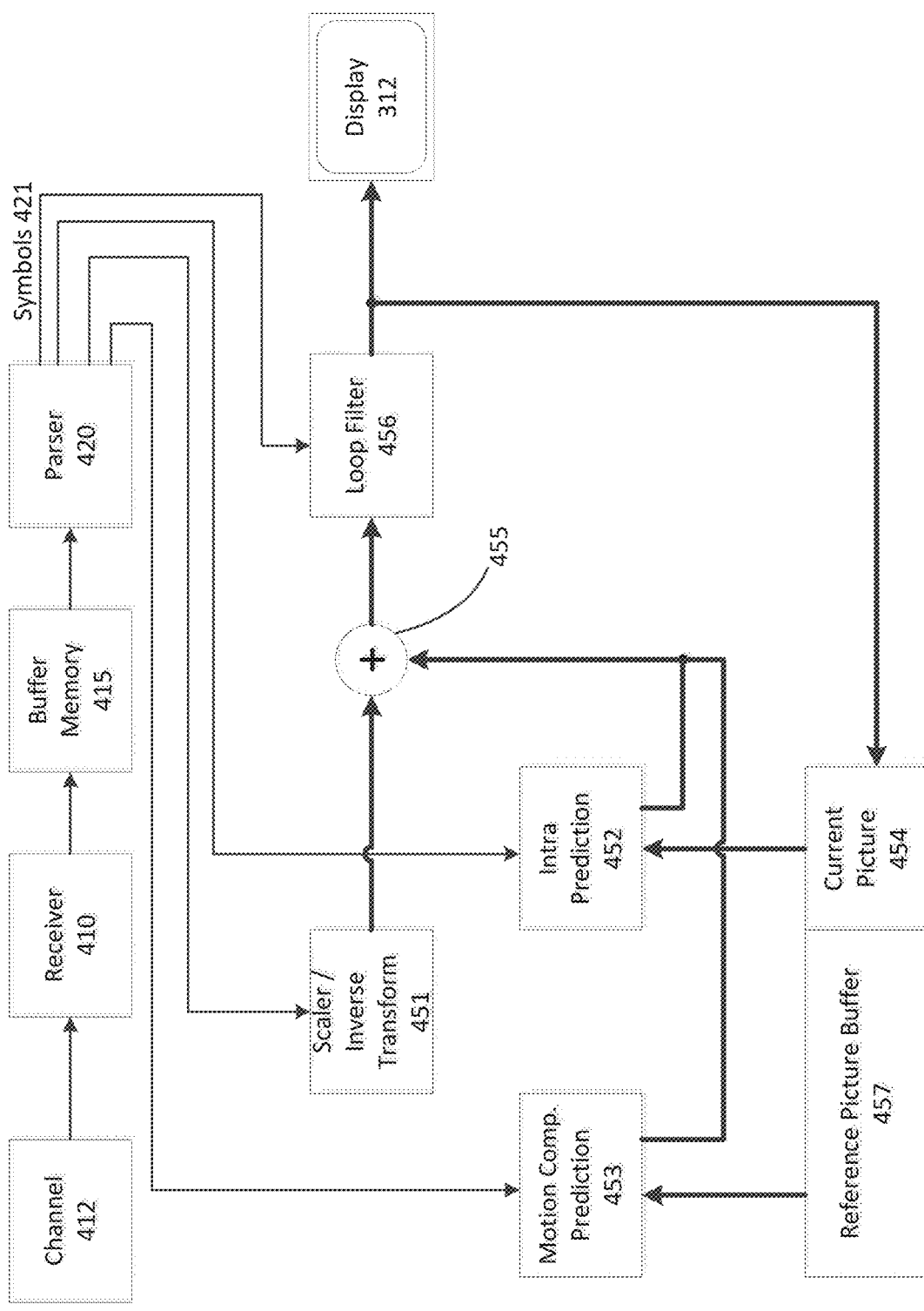
FIG. 4 is a functional block diagram of a video decoder according to an embodiment of the present disclosure.

FIG. 4 may be a functional block diagram of a video decoder (310) according to an embodiment of the present invention.

A receiver (410) may receive one or more codec video sequences to be decoded by the decoder (310); in the same or another embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of Supplementary Enhancement Information (SEI messages) or Video Usability Information (VUI) parameter set fragments (not depicted). The parser (420) may parse/ entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/ inverse transform unit (451), an Intra Prediction Unit (452), or a loop filter (456).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (621) from the parser (420). It can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (454). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video bitstream and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (656) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 5:
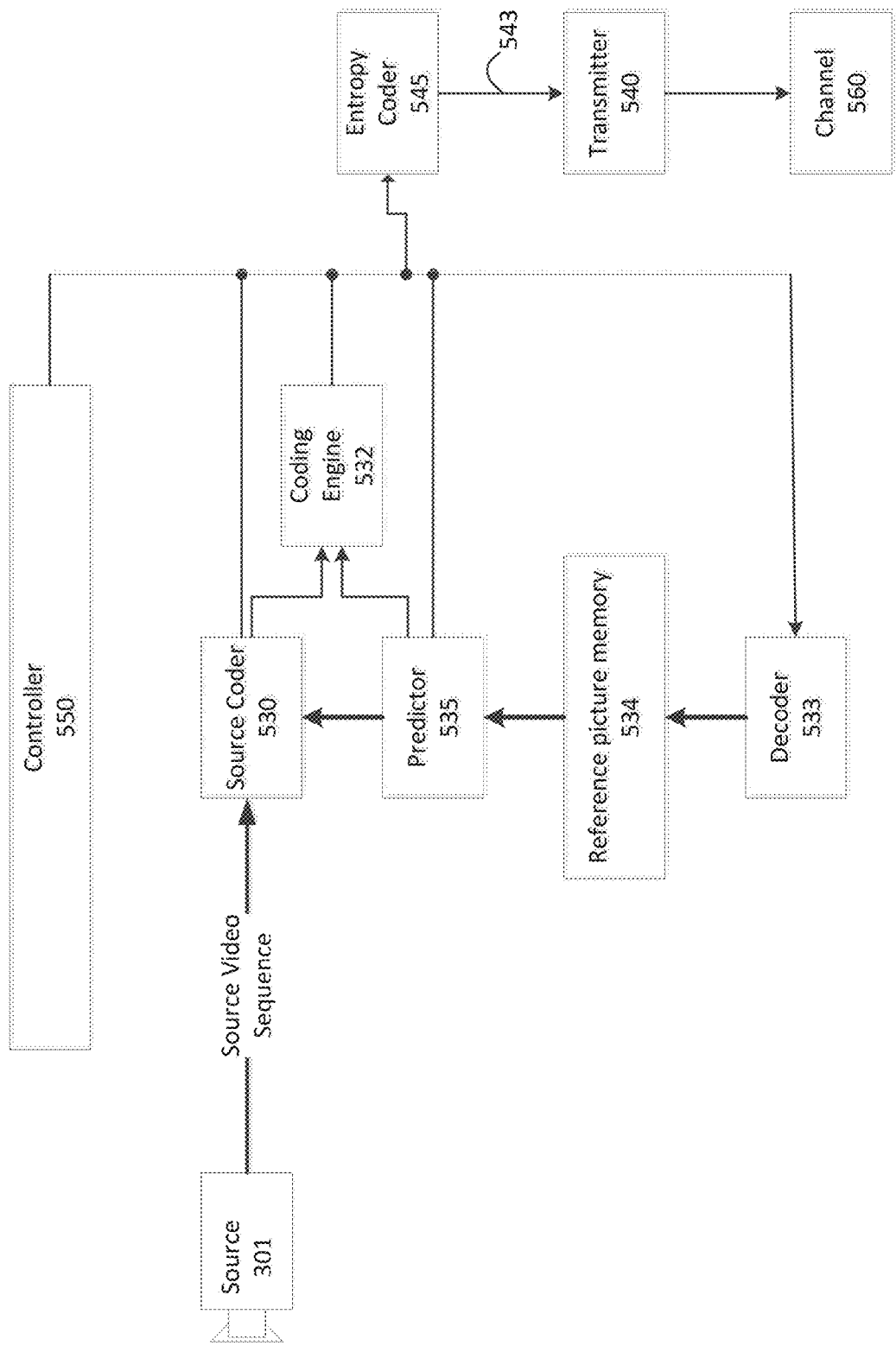
FIG. 5 is a functional block diagram of a video encoder according to an embodiment of the present disclosure.

FIG. 5 may be a functional block diagram of a video encoder (303) according to an embodiment of the present disclosure.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (303) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an over-simplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 5, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device which would store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media. For example, FIG. 6 shows a computer system 1200 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 6:
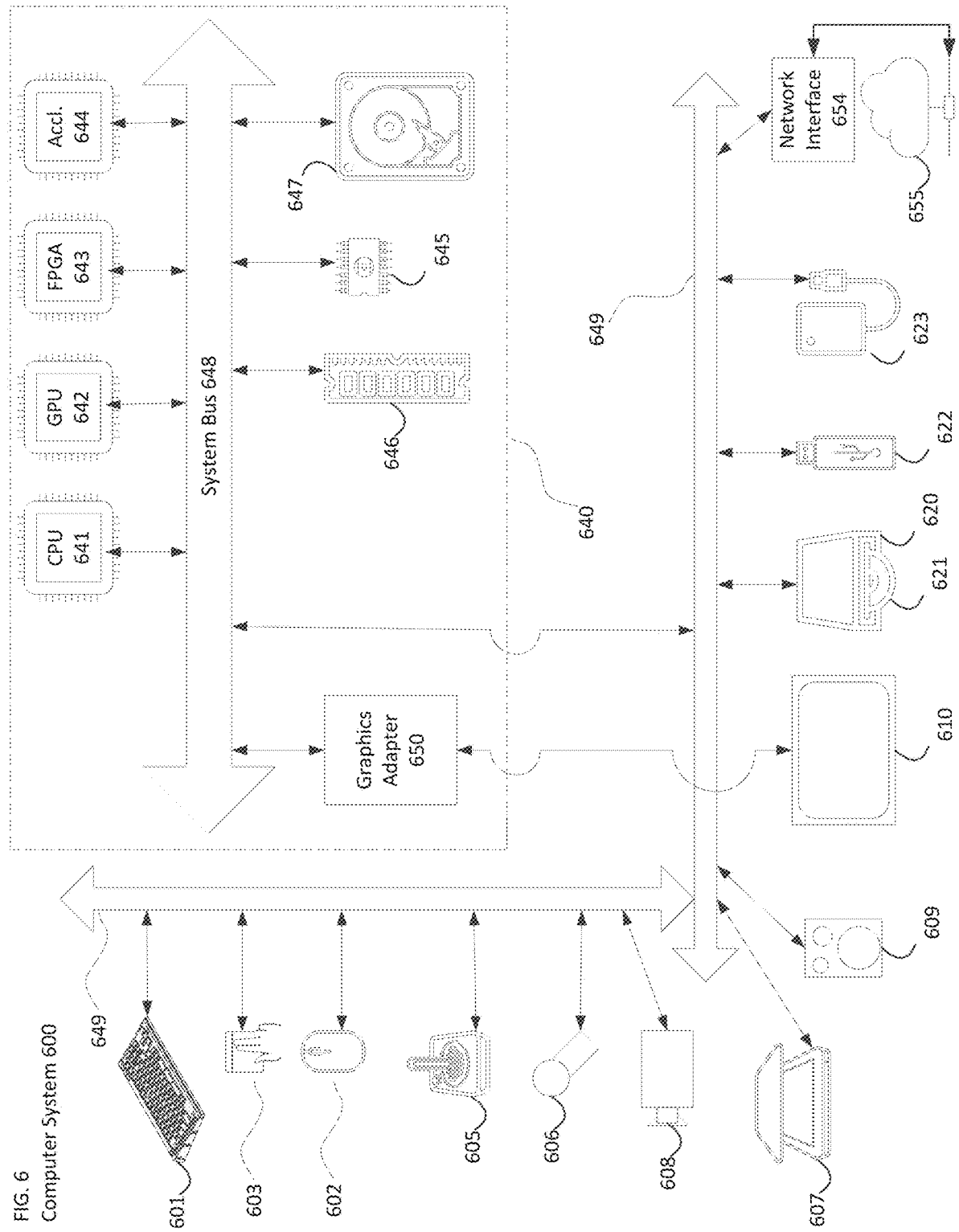
FIG. 6 is a diagram of a computer system in accordance with an embodiment.

The components shown in FIG. 6 for computer system 1200 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1200.

Computer system 1200 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 601, mouse 602, trackpad 603, touch screen 610, data-glove 1204, joystick 605, microphone 606, scanner 607, camera 608.

Computer system 1200 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 610, data-glove 1204, or joystick 605, but there can also be tactile feedback devices that do not serve as input devices), audio output devices (such as: speakers 609, headphones (not depicted)), visual output devices (such as screens 610 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1200 can also include human accessible storage devices and their associated media such as optical media including CD/DVD ROM/RW 620 with CD/DVD or the like media 621, thumb-drive 622, removable hard drive or solid state drive 623, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1200 can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example universal serial bus (USB) ports of the computer system 1200; others are commonly integrated into the core of the computer system 1200 by attachment to a system bus as described below (for example Ethernet interface into a PC computer system or cellular network interface into a smartphone computer system). Using any of these networks, computer system 1200 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 640 of the computer system 1200.

The core 640 can include one or more Central Processing Units (CPU) 641, Graphics Processing Units (GPU) 642, specialized programmable processing units in the form of Field Programmable Gate Areas (FPGA) 643, hardware accelerators for certain tasks 644, and so forth. These devices, along with Read-only memory (ROM) 645, Random-access memory (RAM) 646, internal mass storage such as internal non-user accessible hard drives, solid-state drives (SSDs), and the like 647, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 649. Architectures for a peripheral bus include peripheral component interconnect (PCI), USB, and the like.

CPUs 641, GPUs 642, FPGAs 643, and accelerators 644 can execute certain instructions that, in combination, can make up the aforementioned computer code. That computer code can be stored in ROM 645 or RAM 646. Transitional data can be also be stored in RAM 646, whereas permanent data can be stored for example, in the internal mass storage 647. Fast storage and retrieve to any of the memory devices can be enabled through the use of cache memory, that can be closely associated with one or more CPU 641, GPU 642, mass storage 647, ROM 645, RAM 646, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1200, and specifically the core 640 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 640 that are of non-transitory nature, such as core-internal mass storage 647 or ROM 645. The software implementing various embodiments of the present disclosure can be stored in such devices and executed by core 640. A computer-readable medium can include one or more memory devices or chips, according to particular needs. The software can cause the core 640 and specifically the processors therein (including CPU, GPU, FPGA, and the like) to execute particular processes or particular parts of particular processes described herein, including defining data structures stored in RAM 646 and modifying such data structures according to the processes defined by the software. In addition or as an alternative, the computer system can provide functionality as a result of logic hardwired or otherwise embodied in a circuit (for example: accelerator 644), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method for palette coding to permit the encoding and decoding of a video sequence using a chroma palette and a luma palette, the method comprising:
   determining that a luma color plane and a chroma color plane have different split tree structures;
   determining that a size of a current block is greater than a threshold;
   generating the luma palette by associating a set of luma indices with a set of luma values based on determining that the luma color plane and the chroma color plane have different split tree structures and based on determining that the size of the current block is greater than the threshold;
   generating the chroma palette by associating a set of chroma indices with a first set of chroma values and a second set of chroma values based on determining that the luma color plane and the chroma color plane have different split tree structures; and
   coding a set of samples of the video sequence using the chroma palette and the luma palette based on generating the luma palette and the chroma palette.

2. The method of claim 1, wherein each entry in the luma palette denotes a luma sample value.

3. The method of claim 1, wherein each entry in the chroma palette denotes a set of sample values.

4. The method of claim 1, further comprising:
   determining that an area of a current block is greater than the threshold; and
   wherein generating the luma palette comprises generating the luma palette based on determining that the area of the current block is greater than the threshold.

5. The method of claim 1, further comprising:
   determining that a perimeter of a current block is greater than the threshold; and
   wherein generating the luma palette comprises generating the luma palette based on determining that the perimeter of the current block is greater than the threshold.

6. The method of claim 1, further comprising:
   determining that a sum of a width and a height of a current block is greater than the threshold; and
   wherein generating the luma palette comprises generating the luma palette based on determining that the sum of the width and the height of the current block is greater than the threshold.

7. The method of claim 1, further comprising:
   determining that a length of a longest side of a current block is greater than the threshold; and
   wherein generating the luma palette comprises generating the luma palette based on determining that the length of the longest side of the current block is greater than the threshold.

8. The method of claim 1, further comprising:
   determining that a length of a shortest side of a current block is greater than the threshold; and
   wherein generating the luma palette comprises generating the luma palette based on determining that the length of the shortest side of the current block is greater than the threshold.

9. The method of claim 1, further comprising:
   generating a template palette table; and
   wherein generating the luma palette comprises generating the luma palette based on generating the template palette table.

10. A device for palette coding to permit the encoding and decoding of a video sequence using a chroma palette and a luma palette, comprising:
    at least one memory configured to store program code;
    at least one processor configured to read the program code and operate as instructed by the program code, the program code including:
      determining code configured to cause the at least one processor to determine that a luma color plane and a chroma color plane have different split tree structures;
      wherein the determining code is further configured to cause the at least one processor to determine that a size of a current block is greater than a threshold;
      generating code configured to cause the at least one processor to generate the luma palette by associating a set of luma indices with a set of luma values based on determining that the luma color plane and the chroma color plane have different split tree structures, and based on determining that the size of the current block is greater than the threshold, wherein the generating code is further configured to cause the at least one processor to generate the chroma palette by associating a set of chroma indices with a first set of chroma values and a second set of chroma values based on determining that the luma color plane and the chroma color plane have different split tree structures; and coding code configured to cause the at least one processor to code a set of samples of the video sequence using the chroma palette and the luma palette based on generating the luma palette and the chroma palette.

11. The device of claim 10, wherein each entry in the luma palette denotes a luma value.

12. The device of claim 10, wherein each entry in the chroma palette denotes a set of values.

13. The device of claim 10, wherein the determining code is further configured to cause the at least one processor to determine that an area of a current block is greater than the threshold, and wherein the generating code is further configured to cause the at least one processor to generate the luma palette based on the area of the current block being greater than the threshold.

14. The device of claim 10, wherein the determining code is further configured to cause the at least one processor to determine that a perimeter of a current block is greater than the threshold, and wherein the generating code is further configured to cause the at least one processor to generate the luma palette based on the perimeter of the current block being greater than the threshold.

15. The device of claim 10, wherein the determining code is further configured to cause the at least one processor to determine that a sum of a width and a height of a current block is greater than the threshold, and wherein the generating code is further configured to cause the at least one processor to generate the luma palette base on the sum of the width and height of the current block being greater than the threshold.

16. The device of claim 10, wherein the determining code is further configured to cause the at least one processor to determine that a length of a longest side of a current block is greater than the threshold, and wherein the generating code is further configured to cause the at least one processor to generate the luma palette based on the length of the longest side of the current block being greater than the threshold.

17. The device of claim 10, wherein the determining code is further configured to cause the at least one processor to determine that a length of a shortest side of a current block is greater than the threshold, and wherein the generating code is further configured to cause the at least one processor to generate the luma palette based on the length of the shortest side of the current block satisfying the threshold.

18. The device of claim 10, wherein the generating code is further configured to cause the at least one processor to generate a template palette table, and generate the luma palette table based on the template palette table.

19. A non-transitory computer-readable medium storing instructions, the instructions comprising: one or more instructions that, when executed by one or more processors of a device for palette coding that permits the encoding and decoding of a video sequence using a chroma palette and a luma palette, cause the one or more processors to:

determine that a luma color plane and a chroma color plane have different split tree structures;

determine that a size of a current block is greater than a threshold;

generate the luma palette by associating a set of luma indices with a set of luma values based on determining that the luma color plane and the chroma color plane have different split tree structures, based on determining that the size of the current block is greater than the threshold;

generate the chroma palette by associating a set of chroma indices with a first set of chroma values and a second set of chroma values based on determining that the luma color plane and the chroma color plane have different split tree structures; and code a set of samples of the video sequence using the chroma palette and the luma palette based on generating the luma palette and the chroma palette.

* * * * *